(12) United States Patent
Cook et al.

(10) Patent No.: US 9,460,350 B2
(45) Date of Patent: Oct. 4, 2016

(54) ACTIVITY RECOGNITION IN MULTI-ENTITY ENVIRONMENTS

(75) Inventors: Diane J. Cook, Pullman, WA (US); Aaron Spence Crandall, Pullman, WA (US)

(73) Assignee: Washington State University, Pullman, WA (US)

( * ) Notice: Subject to any disclaimer, the term of this patent is extended or adjusted under 35 U.S.C. 154(b) by 518 days.

(21) Appl. No.: 13/538,882

(22) Filed: Jun. 29, 2012

(65) Prior Publication Data

US 2013/0006899 A1    Jan. 3, 2013

Related U.S. Application Data (60) Provisional application No. 61/503,996, filed on Jul. 1, 2011.

(51) Int. Cl.
*G06K 9/00* (2006.01)

(52) U.S. Cl.
CPC .................................. *G06K 9/00771* (2013.01)

(58) Field of Classification Search
None
See application file for complete search history.

(56) References Cited

U.S. PATENT DOCUMENTS

| | | | |
|---|---|---|---|
| 6,438,491 B1* | 8/2002 | Farmer | 701/301 |
| 8,229,461 B1* | 7/2012 | Manroa | 455/456.1 |
| 2002/0067272 A1 | 6/2002 | Lemelson et al. | |
| 2004/0030531 A1 | 2/2004 | Miller et al. | |
| 2005/0065721 A1* | 3/2005 | Herrtwich | G01C 21/365 701/408 |
| 2005/0078852 A1* | 4/2005 | Buehler | 382/103 |
| 2005/0216274 A1* | 9/2005 | Kim | 704/276 |
| 2006/0251338 A1* | 11/2006 | Gokturk et al. | 382/305 |
| 2007/0061043 A1* | 3/2007 | Ermakov | A47L 5/225 700/263 |
| 2007/0236346 A1* | 10/2007 | Helal et al. | 340/539.22 |
| 2007/0241863 A1* | 10/2007 | Udagawa et al. | 340/5.83 |
| 2007/0247366 A1* | 10/2007 | Smith et al. | 342/464 |
| 2008/0170118 A1* | 7/2008 | Albertson et al. | 348/46 |
| 2008/0189227 A1* | 8/2008 | Kandregula et al. | 706/10 |
| 2009/0009338 A1* | 1/2009 | Hayashi | 340/573.1 |
| 2009/0075634 A1* | 3/2009 | Sinclair et al. | 455/414.1 |
| 2009/0147994 A1* | 6/2009 | Gupta et al. | 382/103 |
| 2009/0157419 A1* | 6/2009 | Bursey | 705/1 |
| 2010/0063774 A1* | 3/2010 | Cook et al. | 702/181 |
| 2010/0090901 A1* | 4/2010 | Smith et al. | 342/451 |
| 2010/0235285 A1* | 9/2010 | Hoffberg | 705/75 |
| 2011/0283338 A1* | 11/2011 | Yang et al. | 726/4 |
| 2012/0050535 A1* | 3/2012 | Densham et al. | 348/159 |
| 2012/0327241 A1* | 12/2012 | Howe | 348/155 |

OTHER PUBLICATIONS

Helal et al, "The Gator Tech Smart House: A Programmable Pervasive Space", Computer (vol. 38 , Issue: 3), IEEE Computer Society, Date of Current Version: Apr. 4, 2005, Issue Date: Mar. 2005.*

(Continued)

*Primary Examiner* — Stanley K Hill
*Assistant Examiner* — Ilya Traktovenko
(74) *Attorney, Agent, or Firm* — Lee & Hayes, PLLC (57) ABSTRACT

A physical environment is equipped with a plurality of non-obtrusive sensors (e.g., motion sensors). As a plurality of residents perform various activities within the physical environment, sensor readings are received from one or more of the sensors. Based on the sensor readings, each of the plurality of residents is identified and locations of each of the plurality of residents are tracked.

13 Claims, 6 Drawing Sheets

(56) References Cited

OTHER PUBLICATIONS

Das et al, "The Role of Prediction Algorithms in the MAVHOME Smart Home Architecture", IEEE Wireless Communications, Dec. 2002.*

Kung et al, "Efficient Location Tracking Using Sensor Networks", Division of Engineering and Applied Sciences Harvard University, Cambridge, MA 02138, U.S.A., Proceedings of 2003 IEEE Wireless Communications and Networking Conference (WCNC), 2003.*

Rashidi, "Keeping the Resident in the Loop: Adapting the Smart Home to the User", IEEE Transactions on Systems, Man, and Cybernetics—Part A: Systems and Humans, vol. 39, No. 5, Sep. 2009.*

Roy, "Location Aware Resource Management in Smart Homes", CReWMaN Lab, Computer Science and Engineering Department, The University of Texas at Arlington, Proceedings of the First IEEE International Conference on Pervasive Computing and Communications (PerCom'03), 2003.*

Yu et al, "Human Localization via Multi-Cameras and Floor Sensors in Smart Home", 2006 IEEE International Conference on Systems, Man, and Cybernetics Oct. 8-11, 2006.*

Hightower et al, "Particle Filters for Location Estimation in Ubiquitous Computing: A Case Study", UbiComp 2004, LNCS 3205, pp. 88-106, 2004, Springer-Verlag Berlin Heidelberg 2004.*

Crandall et al, "Coping with multiple residents in a smart environment", Journal of.Ambie.ntJntelligence and Smart.Environments 1(2009)1-12 DOI 10.3233/AIS-2009-0041 IOS Press.*

Jakkula et al, "Knowledge Discovery in Entity Based Smart Environment Resident Data Using Temporal Relation Based Data Mining", Seventh IBEE International Conference on Data Mining—Workshops, 2007 IEBB DOI 10.1109/ICDMW.2007.107.*

The PCT Search Report mailed Sep. 11, 2012 for PCT application No. PCT/US2012/045150, 7 pages.

* cited by examiner

ACTIVITY RECOGNITION IN MULTI-ENTITY ENVIRONMENTS

RELATED APPLICATION

This application claims the benefit of U.S. Provisional Application No. 61/503,996, filed Jul. 1, 2011, which is hereby incorporated by reference.

BACKGROUND

Smart environments (e.g., homes or other environments fitted with a plurality of sensors) show great promise for a variety of uses including, for example, medical monitoring, energy efficiency, and ubiquitous computing applications. Activity recognition, for example, is possible within a smart environment based on various sensor readings. However, when multiple individuals are active within a smart environment, activity recognition is complicated due to the possible detection of sensor readings caused by each of two or more different individuals.

SUMMARY

In a smart environment (e.g., a home or other environment fitted with a plurality of sensors) equipped with non-obtrusive sensors, multiple residents may be identified and locations of the multiple residents may be tracked. Particular residents may be identified based on behaviometrics data, a naïve Bayes classifier, and/or a hidden Markov model. Furthermore, locations of particular residents may be tracked according to a graph and rule-based entity detector, a particle filter-based entity detector, or a Bayesian updating graph-based entity detector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The various features described herein may, for instance, refer to device(s), system(s), method(s), and/or computer-readable instructions as permitted by the context above and throughout the document.

BRIEF DESCRIPTION OF THE DRAWINGS

The Detailed Description below is described with reference to the accompanying figures. In the figures, the left-most digit(s) of a reference number identifies the figure in which the reference number first appears. The same numbers are used throughout the drawings to reference like features and components.

DETAILED DESCRIPTION

Smart environments include homes, apartments, workplaces, and other types of spaces that are equipped with any of a variety of types of sensors, controllers, and a computer-driven decision making process. Such smart environments enable ubiquitous computing applications including, for example, applications to support medical monitoring, energy efficiency, assistance for disabled individuals, monitoring of aging individuals, or any of a wide range of medical, social, or ecological issues. The types of sensors that may be employed to establish a smart environment may include, for example, wearable sensors that are attached to a particular user, cameras, microphones, or less obtrusive sensors (e.g., motion sensors) that are placed at various locations within the environment. Many individuals do not like the idea of having to wear a sensor during daily activities. Furthermore, relying on wearable sensors may lead to less data or unreliable collection of data, for example, if a user forgets to attach a sensor to themselves. Similarly, many individuals are not interested in living in an environment that is equipped with cameras and microphones to track their activities.

While wearable sensors are less than desirable due to the reasons stated above, smart environments that utilize less obtrusive sensors pose challenges as well. For example, because wearable sensors are attached to a particular individual, any readings from a particular wearable sensor can easily be attributed to the particular individual. In contrast, non-wearable sensors that are located throughout an environment may detect activity, but attributing the activity to a particular individual may be a challenge, for example, if multiple individuals are within the environment when the activity is detected. Furthermore, while many sensors within a smart environment may be positioned to detect activity by human beings within the environment, movement of other entities such as pets within the environment may also be detected by the sensors.

This Detailed Description describes tools to address challenges of identifying and tracking multiple residents within a smart environment in which passive environmental sensors (e.g., motion detectors) are implemented. The tools described herein include algorithms to estimate the number of individuals in the environment, algorithms to track the individuals, and ways to use the gathered information to recognize activities of particular individuals or entities amidst a multi-resident setting.

Example Environment

Figure 1:
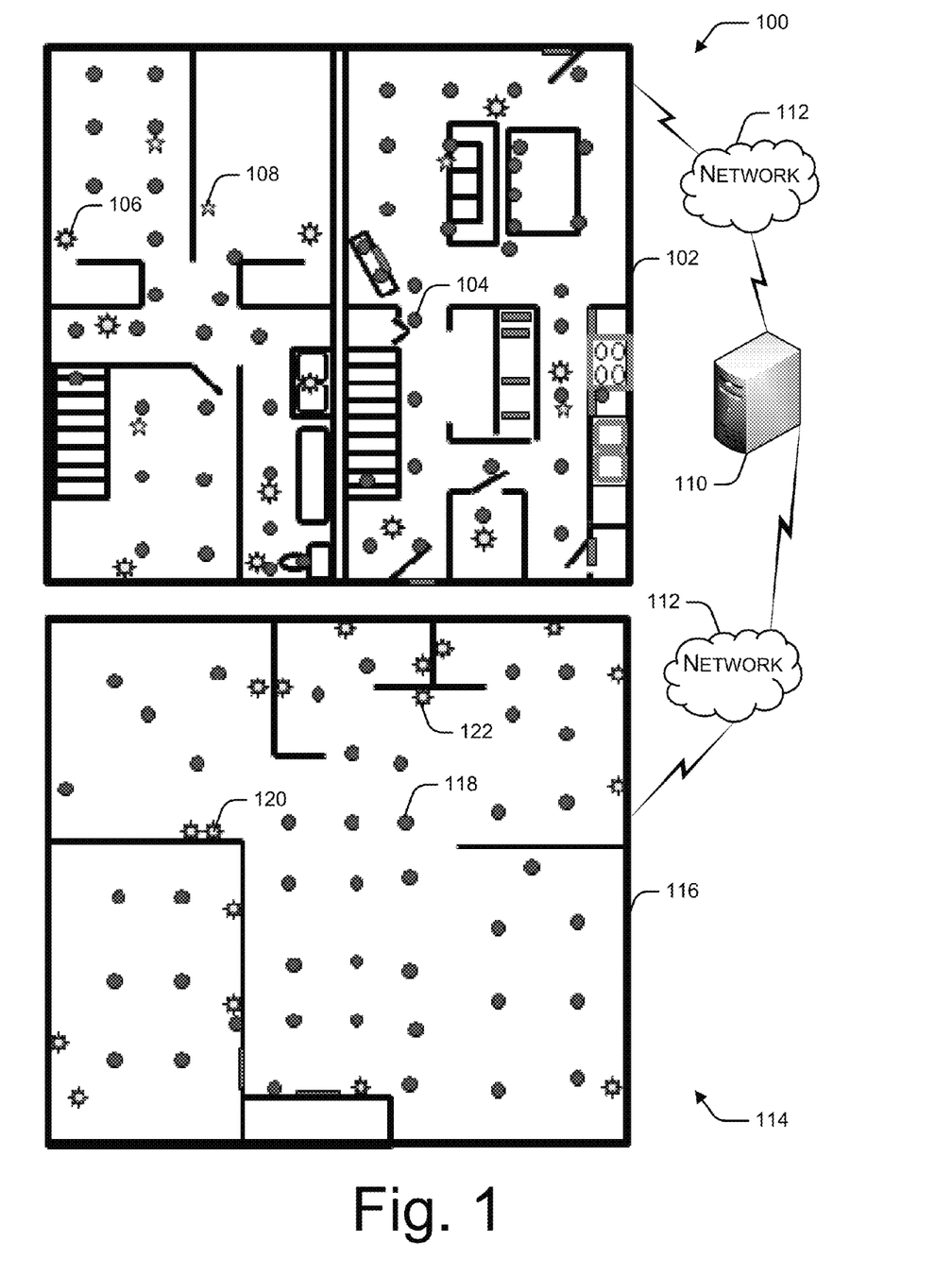
FIG. 1 is a pictorial diagram of two example smart environments.

FIG. 1 illustrates two example implementation environments, each including a smart environment. Example implementation environment 100 includes smart environment 102, which includes various sensors. In the illustrated example, the sensors include motion sensors 104, light sensors 106, and/or controllers 108. Percepts are gathered by the various sensors and transmitted to a computing device 110, for example, over a network 112. In response, data may be sent from computing device 110, over network 112, to one or more controllers 108. The network 112 may include any combination of wired and/or wireless networks. By way of example, the network 112 may include one or more personal area networks (PANs), home area networks (HANs), local area networks (LANs), and/or wide area networks (WANs).

Example implementation environment 114 includes smart environment 116, which also includes various sensors. In the illustrated example, the sensors include motion sensors 118, light sensors 120, and/or controllers 122.

Implementation environments 100 and 114 describe several example configurations of smart environments using various sensors. However, in other examples, other combinations of these and other sensors may be used to implement a smart environment. Some other passive sensors that could be used to implement smart environments include, for example, temperature sensors (e.g., infrared sensors to detect body heat), sound sensors, proximity sensors, or the like.

Entity Detection

Three example approaches for detecting multiple entities within a smart environment are described herein. The described example approaches are 1) a graph and rule-based entity detector; 2) a Bayesian updating graph-based entity detector; and 3) a particle filter-based entity detector. These approaches may be used individually or in combination with each other and/or with other entity detection approaches.

Figure 2:
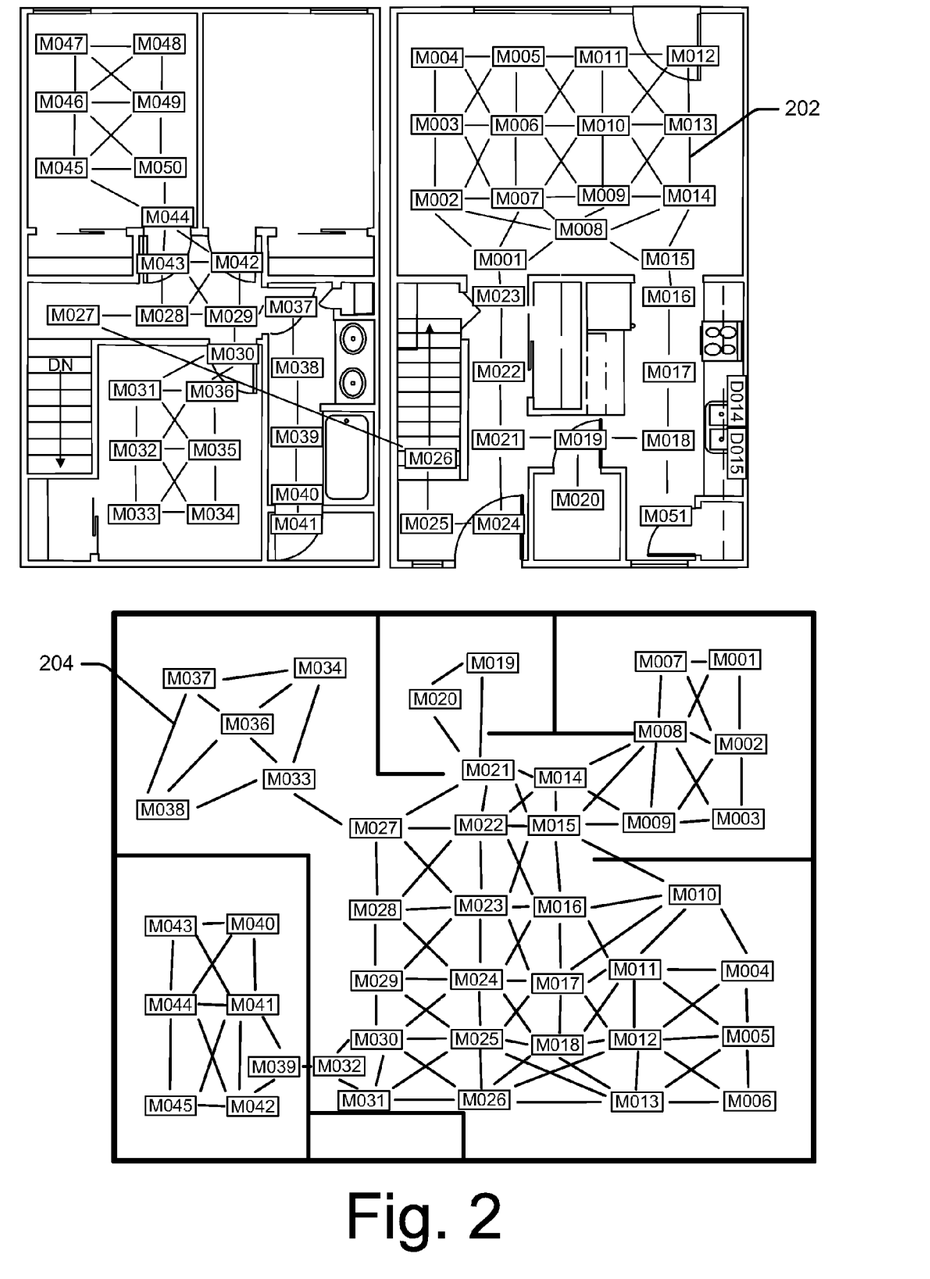
FIG. 2 is a pictorial diagram of an example graphs implemented in two example smart environments to support a graph and rule-based entity detector.

FIG. 2 illustrates two example graphs to support a graph and rule-based entity detector. The first example graph 202 is defined for example smart environment 102 shown in FIG. 1. The second example graph 204 is defined for example smart environment 116, also shown in FIG. 1.

The graph and rule-based entity detector is based on an understanding that sensors are tripped in an expected order as entities (e.g., individuals, pets, or any other moving objects) move from one area to another within a smart environment. Furthermore, it is also understood that if multiple entities are in a smart environment, there are typically one or more sensors located between any two entities at various times throughout a day (e.g., two or more entities will not always be located in the same place with respect to the various sensors).

As illustrated in FIG. 2, a graph is defined for a smart environment such that each vertex represents a location of a motion detector, and each edge connects a pair of vertices if it is possible to move from one vertex of the pair to the other vertex of the pair without tripping another motion sensor. Using the graph defined for a particular smart environment, a set of logical rules is defined for identifying and tracking entities within the smart environment. In an example implementation, the set of logical rules may be defined such that:

A new entity is defined when a motion sensor is activated at a location with no adjacent known entities.

An existing entity is removed when it moves to a location adjacent to a doorway or fails to generate sensor events for an extended period of time (e.g., a configurable timeout threshold may be set to a predetermined value such as, for example, 300 seconds).

An existing entity is tracked as having moved to a new location if a motion sensor is activated at or next to the current location of the existing entity.

If more than one entity is a candidate for a detected move, then the move is attributed to the entity that moved most recently.

While rule-based approaches may be effective most of the time, there may be edge scenarios that are not accounted for in the graph. For example, if an entity moves very quickly or very slowly from one area to another, it may be possible for the entity to change locations without tripping all of the adjacent motion sensors along the path. One or more of the examples described below may be used to account for these edge scenarios.

As a second example, a Bayesian updating graph-based entity detector may be implemented by replacing the graph described above with a transition matrix that represents the probability of an entity moving from one sensor location to another within the smart environment. In the Bayesian updating graph-based entity detector, beginning with some training data, the graph probabilities are gradually updated over time. If the sensors in a smart environment are denoted as $s_1, s_2, s_3, \ldots, s_n$, then the probability of a particular entity e moving to a location indicated by a tripped sensor $s_k$ is calculated based on a likelihood that the sensor event could have been generated by entity e based on the previous known location of entity e.

In this example, Bayes' Rule is used to determine which entity moved based on a detected sensor event. Bayes' Rule is defined as:

$$\mathrm{argmax}_{e \in E} P(e \mid s_k) = \frac{P(s_k \mid s_{k-1}) P(e)}{P(s_k)}$$

where $P(e)$ and $P(s_k)$ are constant over all choices of e. Thus, the selection of the entity that triggered the sensor at location k is based on the probability that an entity will move between the two locations indicated by $s_k$ and $s_{k-1}$ in the matrix. In an example implementation, these probabilities may be estimated from a relative frequency with which an entity moves between locations based on human-annotated training data. In another example, these probabilities may be initially set to a default value (e.g., a uniform distribution) and may be incremented or decremented over time based on use (i.e., based on actual data from a deployed system). In such an implementation, the system may learn over time such that the probabilities converge on the actual probabilities for the specific deployment. Moreover, this data may be leveraged for use in selecting initial default probability values for future deployments.

In an example implementation, the Bayesian updating graph-based entity detector maintains an additional location in the matrix to represent "outside." The Bayesian updating graph-based entity detector uses this location to determine when an entity leaves the smart environment or enters the smart environment. Furthermore, in the example implementation, a timeout is used to remove entities that have not caused sensor events in a long time. For example, this can be used to handle a scenario in which multiple entities leave the space together as a group, and the sensors are unable to distinguish between the individual entities.

As the Bayesian updating graph-based entity detector receives sensor data, the data is attributed to an individual entity. Over time, a stream of sensor data for each individual entity is generated.

A third approach that may be used in addition to or instead of the above-described graph-based and Bayesian updating strategies is a particle filter-based entity detector. The particle filter-based entity detector initializes a sequential Monte Carlo method (particle filter) for each entity in the model. Each particle filter is defined as a set of possible hypotheses, with each hypothesis, or particle, representing a possible current state for the target entity. Particles update their state values each cycle of the algorithm according to an action model that represents a distribution of the target entity's likely movement. Particles are weighted based on their likelihood given available sensor event information. During particle re-sampling, lightly-weighted particles are removed and heavily-weighted particles are replicated.

In an example particle filter-based entity detector implementation, the filters contain n=100 particles. Every particle is a Cartesian pair <x,y> representing the current state (location) of an entity. A filter centroid is calculated as a weighted mean of all n current particles within the filter, and an entity's current location is given by this centroid value. In an example algorithm implementation, the action model is a random walk, constrained by possible movements as indicated in the environment graph, as illustrated in FIG. 1. For example, a movement from a sensor in one room directly to a sensor in another room would not be allowed if it would require that an entity move through a wall.

The weight of each particle p is updated after event k by determining if its new location is within the viewing range of sensor s that generated an event, according to the following equation:

$$w_k = \begin{cases} w_{k-1} * 0.90 & \text{if } p_x = s_x \pm 0.60 \text{ and } p_y = s_y \pm 0.60 \\ w_{k-1} * 0.10 & \text{otherwise} \end{cases}$$

As a result, particles with locations inside the range of sensor s retain 90% of their previous weight, while other particles retain only 10% of their previous weight. This process draws the filter centroid toward the area covered by sensor s.

After the filter weights $w_1, \ldots, w_n$ are updated, they are normalized to prevent the weights from becoming too small and diverging in scale over filter updates. Lastly, the filter particles are re-sampled if the Effective Sample Size (ESS) falls below a threshold of $\alpha=0.80*n$, where the ESS is calculated according to:

$$Ess = \frac{1}{\sum_{i=1}^{n} w_i^2}$$

Each of the three above-described example entity detection schemes provides for localization and tracking of entities within a smart environment without the need for wearable or carried devices or privacy-invasive cameras and microphones. As noted above, these example entity detection schemes may be used individually or in combination with each other and/or other entity detection schemes to accurately track locations of multiple entities in an environment.

Entity Identification

In addition to detecting the presence and tracking the location of one or more entities within a smart environment, additional information can be gathered by being able to specifically identify individual entities within the smart environment. As discussed above, if wearable or otherwise intrusive sensors are used, it can be fairly easy to determine who a particular entity is. However, when using motion sensors and other non-intrusive sensors, entity identification can be more challenging. As a result of identifying specific individuals, the monitored data can be used, for example, to assess the health and well-being of specific individuals and/or to provide contextually relevant services based on the identified specific individuals.

In an example implementation, behaviometrics are used to identify individual residents within a smart environment. Rather than identifying an individual based on tagging (e.g., wearable sensors) or tracking them throughout a space, individuals are identified based on unique behaviometrics that are generated when each resident performs unique sequences of actions at unique times within the smart environment. That is, different entities may perform different tasks in a perceptively different sequence or pattern of actions and/or at different times. These differences may be discerned by the system and used to identify different entities within the smart environment.

If training data is available for which each sensor event is already labeled with a corresponding resident, then a variety of supervised learning techniques can be used to learn a mapping from sensor event contexts to a corresponding entity. In this example, each entity is assigned a unique identifier or resident ID. Two examples of such learning techniques include a naïve Bayes classifier (NBC) and a hidden Markov model (HMM). The naïve Bayes classifier leverages Bayes' rule (shown below) to label an event with a resident ID, r, by using event features, D, including the sensor identifier, the value of the sensor reading, and the time of day. Bayes' rule is given by:

$$\text{argmax}_{r \in R} P(r \mid D) = \frac{P(D \mid r)P(r)}{P(D)}$$

Figure 3:
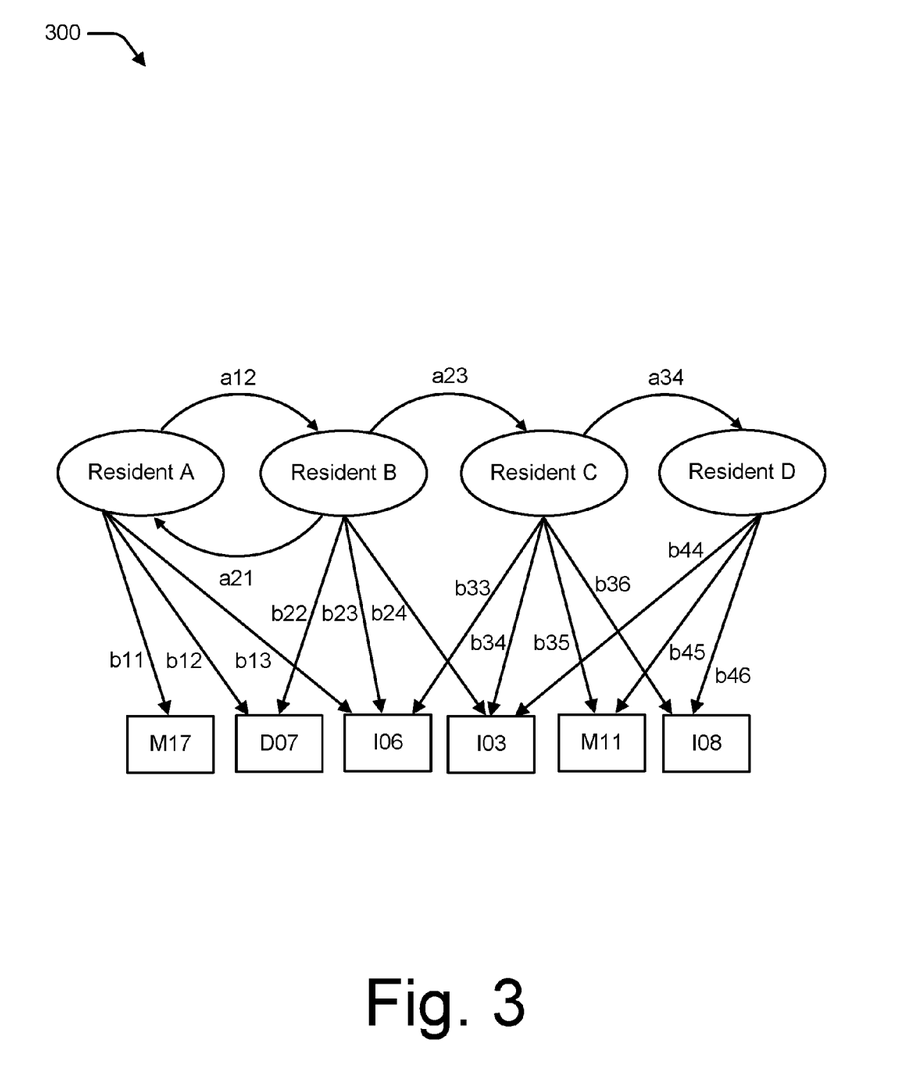
FIG. 3 is a model diagram of an example hidden Markov model for learning resident identities.

Unlike a naïve Bayes classifier, a hidden Markov model encapsulates sequential dependencies between individual events observed in an event sequence. In a HMM, hidden nodes represent abstract states that cannot be directly observed, which in this case are the resident IDs. In contrast, observable nodes represent system states that can be directly observed. In this case the observable nodes represent the sensor event features, as are given to the NBC. Vertical relationship probabilities between hidden and observed nodes are learned from training data, as are horizontal transition probabilities between hidden nodes. FIG. 3 shows an example HMM for learning resident identities.

In an example implementation, a Viterbi algorithm is used to identify a resident that corresponds to a sensor event. The Viterbi algorithm calculates the most likely sequence of hidden states corresponding to an observed sensor event sequence. This sequence of hidden states provides the highest-likelihood resident IDs for the event sequence. HMMs are typically robust in the presence of noisy data, but may require more training data than the NBC to perform well because of the increased complexity of the stochastic model.

Activity Recognition

In addition to the ability to detect, track, and identify residents, smart environments can provide added value by recognizing specific activities. Examples of specific activities that may be recognized include, but are not limited to, sleeping, bathing, bed to toilet transition, grooming, preparing/eating breakfast, watching TV, cleaning the bathroom, working at the computer, preparing/eating lunch, preparing/eating dinner, cleaning the apartment, or studying. Activity recognition may be implemented by comparing a pattern or sequence of detected actions with predetermined patters or sequences of actions corresponding to known activities. Activity recognition provides valuable insight regarding resident behavior, and may provide tools that will enable older adults to remain at home, rather than entering a supervised nursing facility. Activity recognition can also be utilized to enable a smart environment to provide context-aware services to the environment residents. For example, activity recognition may be used to prompt environment residents to take medication, feed pets, take out the trash, turn off appliances, or the like. In an example implementation, the activities that are identified may include well-known ADLs (Activities of Daily Living). In another implementation, the activities that are identified may also include additional activities that are not included in a list of ADLs, but that occur on a frequent basis.

Various techniques for identifying and recognizing activities within a smart environment are described in additional detail in US Patent Application Publication Number 2010/0063774, filed Sep. 2, 2009 and published Mar. 11, 2010, titled "Systems and Methods for Adaptive Smart Environment Automation," the contents of which are incorporated herein by reference.

Example Computing Device

Figure 4:
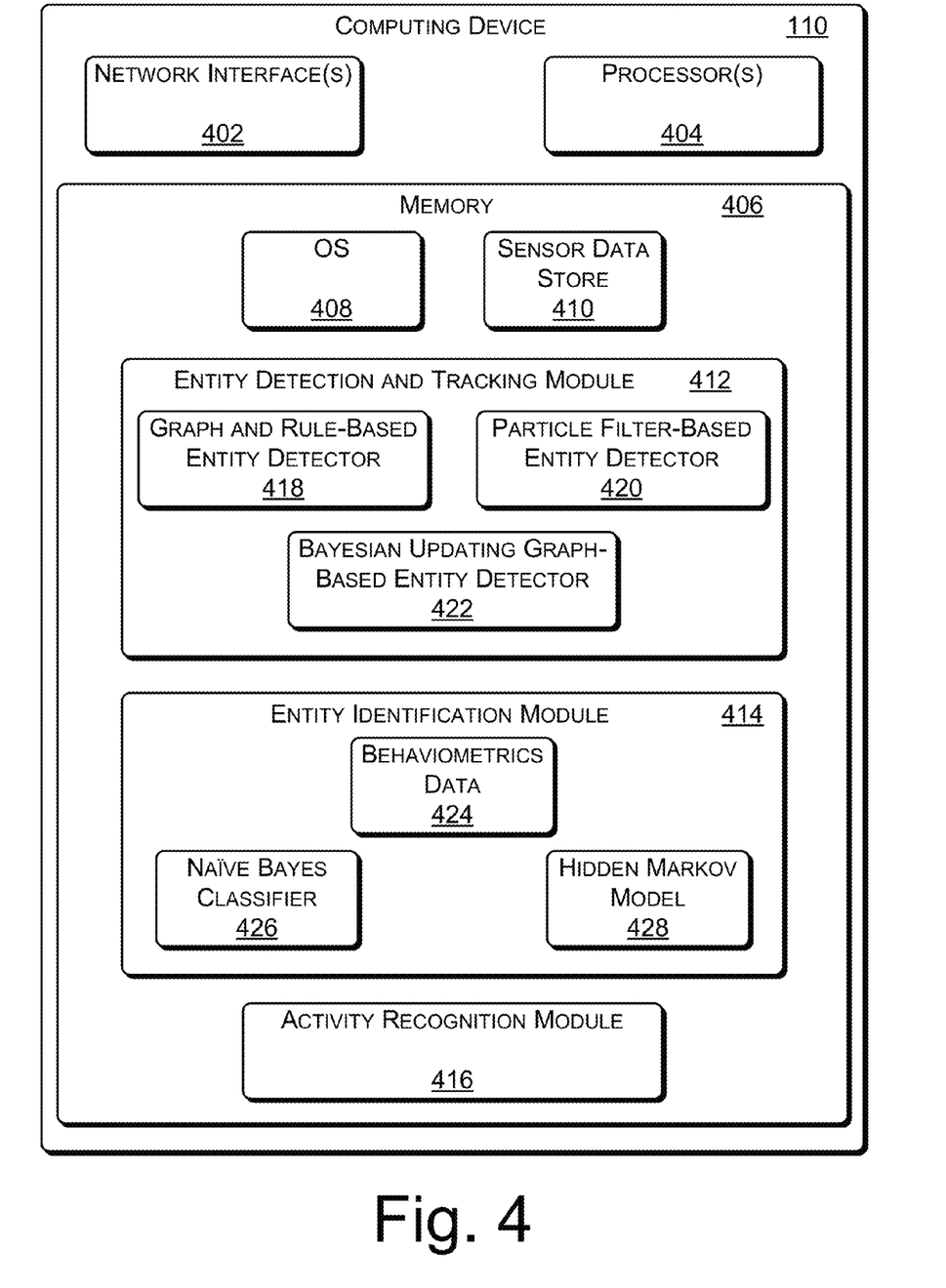
FIG. 4 is a block diagram illustrating select components of an example computing device implemented to support entity detection, entity tracking, entity identification, and activity recognition within a smart environment.

FIG. 4 illustrates example components of a computing device implemented to support entity detection, entity tracking, entity identification, and activity recognition within a smart environment. Example computing device 110 includes network interface(s) 402, processor(s) 404, and memory 406. Network interface(s) 402 enable computing device 110 to receive and/or send data over a network, for example, as illustrated and described above with reference to FIG. 1. Processor(s) 404 are configured to execute computer-readable instructions to perform various operations. Computer-readable instructions that may be executed by the processor(s) 404 are maintained in memory 406, for example, as various software modules.

In an example implementation, memory 406 may maintain any combination or subset of components including, but not limited to, operating system 408, sensor data store 410, entity detection and tracking module 412, entity identification module 414, and/or activity recognition module 416. Sensor data store 410 may be implemented to store data that is received from one or more sensors implemented in one or more smart environments.

Entity detection and tracking module 412 may be implemented to include one or more entity detectors for detecting residents within a smart environment. In an example implementation, entity detection and tracking module 412 may include one or more of a graph and rule-based entity detector 418, a particle filter-based entity detector 420, and/or a Bayesian updating graph-based entity detector 422.

Entity identification module 414 may be implemented to include one or more schemes for identifying particular individuals within a smart environment. In an example implementation, entity identification module 414 includes behaviometrics data 424, which may include pre-defined training data. Entity identification module 414 may also include a naïve Bayes classifier 426 and/or a hidden Markov model 428.

Example Operation

Figure 5:
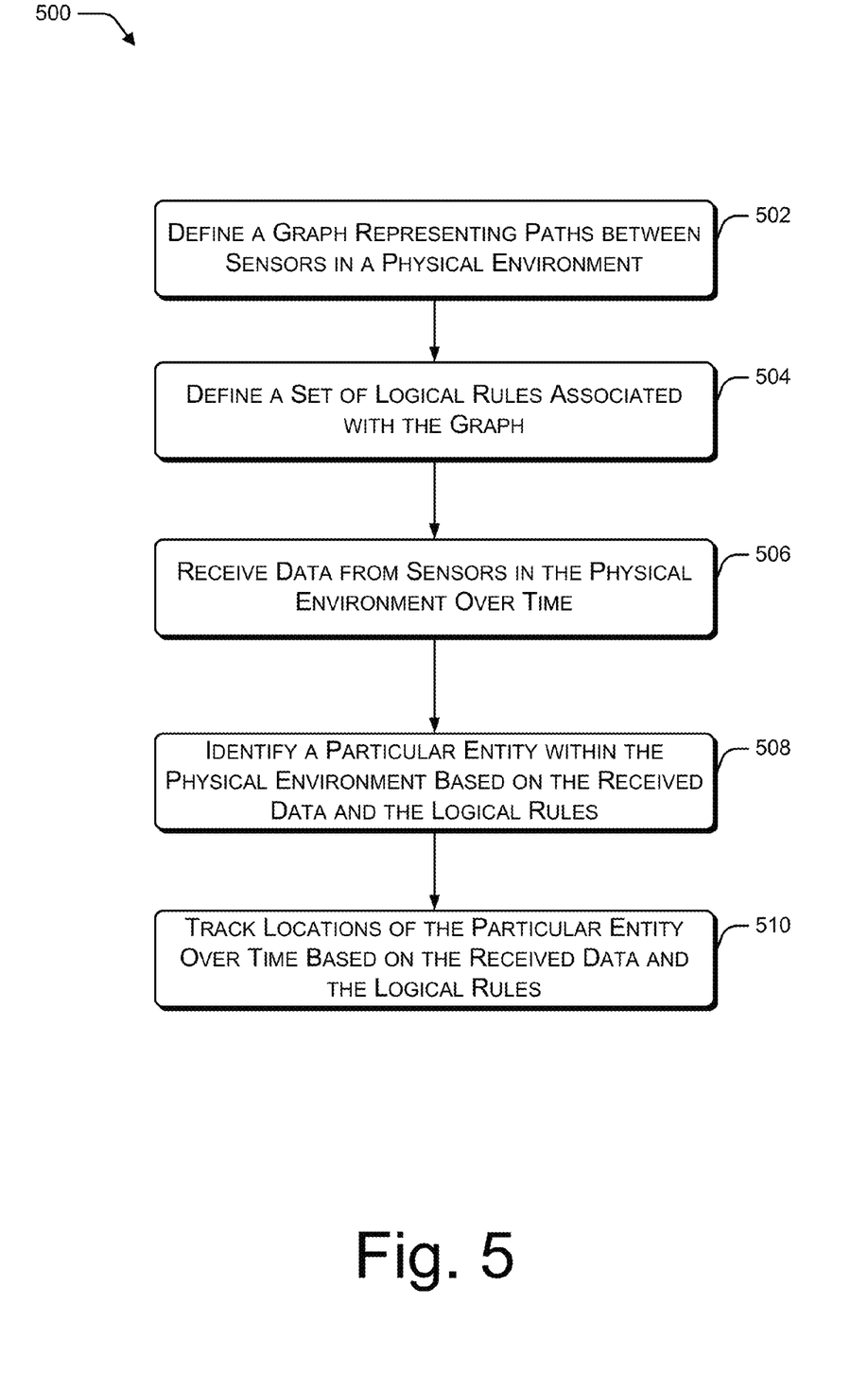
FIG. 5 is a flow diagram of an example process for utilizing a graph and rule-based entity detector.
Figure 6:
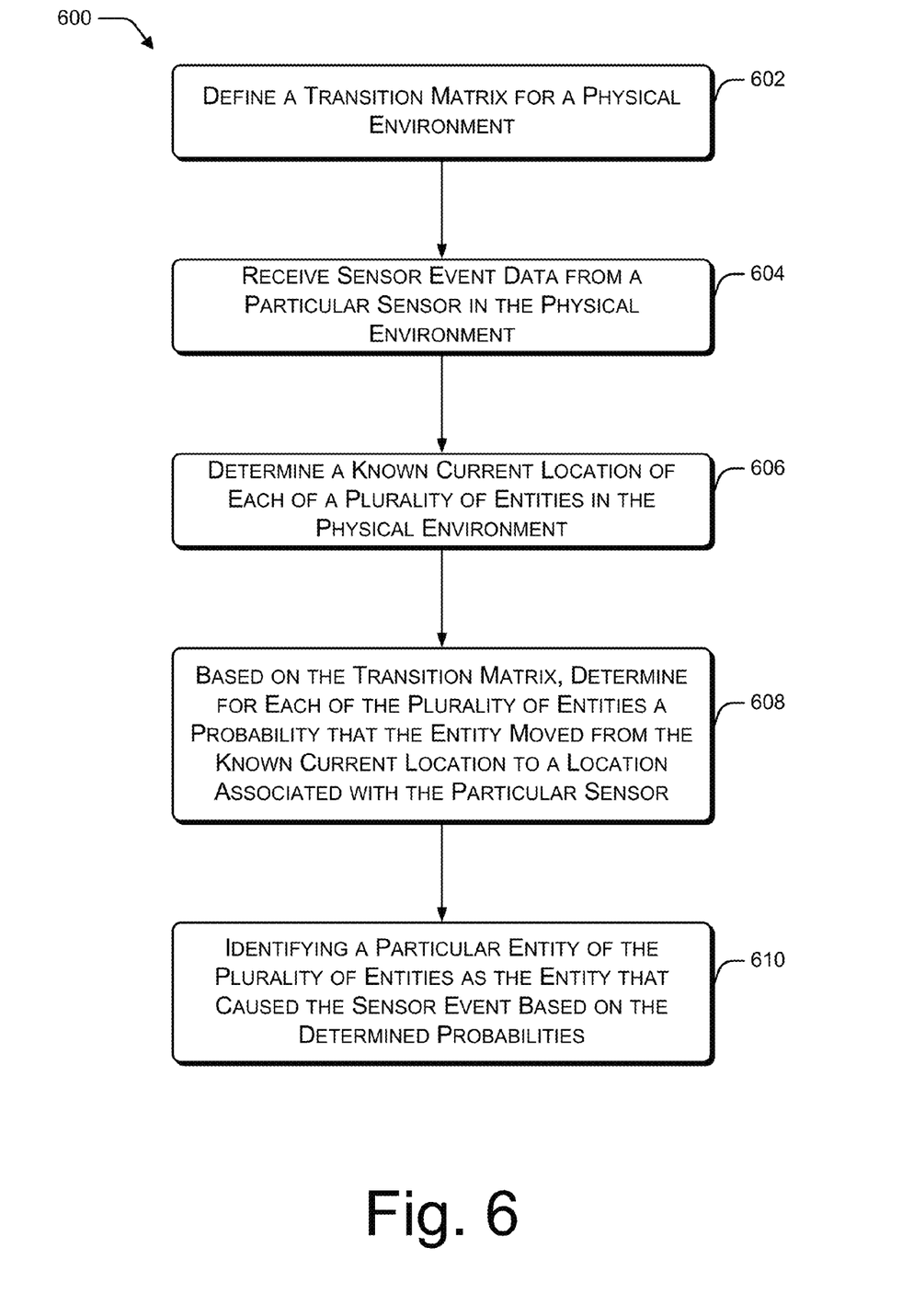
FIG. 6 is a flow diagram of an example process for utilizing a Bayesian updating graph-based entity detector.

FIGS. 5 and 6 illustrate example processes for implementing entity and activity recognition in multi-entity environments, as described herein. These processes are illustrated as collection of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the computing device 110 described above with reference to FIG. 4, other computer architectures may implement one or more portions of these processes, in whole or in part.

FIG. 5 illustrates an example process 500 for identifying a particular entity within a physical environment and tracking the location of the particular entity within the physical environment according to a graph and rule-based entity detector.

At block 502, a graph representing paths between sensors in a physical environment is defined. For example, as described above with reference to FIG. 2, a graph is defined for a smart environment such that each vertex represents a location of a sensor, and each edge connects a pair of vertices if it is possible to move from one vertex of the pair to the other vertex of the pair without tripping another sensor.

At block 504, a set of logical rules associated with the graph is defined. As described above with reference to FIG. 2, the set of logical rules may be defined to account for typical motion of a entity within a physical environment, such that, for example, (1) a new entity is defined when a motion sensor is activated at a location with no adjacent known entities; (2) an existing entity is removed when it moves to a location adjacent to a doorway or fails to generate sensor events for an extended period of time; (3) an existing entity is tracked as having moved to a new location if a motion sensor is activated at or next to the current location of the existing entity; and (4) if more than one entity is a candidate for a detected move, then the move is attributed to the entity that moved most recently.

At block 506, over time, data is received from one or more sensors in the physical environment. As entities move about within a physical environment equipped with a plurality of sensors, various sensor events are triggered and data from the sensors is received. For example, data from the sensors may be received by computing device 110 and stored in sensor data store 410.

At block 508, a particular entity within the physical environment is identified based on the received sensor data and the logical rules, and at block 510, locations of the particular entity are tracked over time based on the received sensor data and the logical rules. For example, graph and rule-based entity detector 418 and entity identification module 414 may be utilized to identify and track locations of particular entities within the physical environment.

FIG. 6 illustrates an example process 600 for tracking the location of a particular entity within a physical environment according to a Bayesian updating graph-based entity detector.

At block 602, a transition matrix is defined for a physical environment. For example, as described above with reference to FIG. 2, a Bayesian updating graph may be defined to represent the probability of an entity moving from one sensor location to another within the physical environment.

At block 604, data is received from a particular sensor within the physical environment.

At block 606, a known current location of each of a plurality of entities in the physical environment is determined. For example, based on previously received sensor data, a current location is attributed to each entity within the physical environment.

At block 608, based on the transition matrix, for each of the plurality of entities in the physical environment, a probability that the entity moved from the known current location to a location associated with the particular sensor is determined.

At block 610, a particular entity of the plurality of entities is identified as the entity that caused the sensor event based on the determined probabilities. For example, the entity that is assigned the highest probability of having caused the sensor event is identified.

CONCLUSION

Smart environments may be implemented using non-obtrusive sensors to detect, identify, and track the locations of multiple residents. Furthermore, various algorithms may be employed to utilize data received from the various sensors to determine specific activities being performed by specific individuals. This information can be used to provide a variety of benefits including, but not limited to, allowing older adults to age in place, monitor the health and well-being of smart environment residents, and to provide context-aware services within the smart environment.

Although the subject matter has been describe din language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
   defining a graph including vertices and edges, wherein each vertex corresponds to a sensor in a physical environment and each edge represents a direct path between two vertices with no other vertices between the two vertices along the path;
   defining a set of logical rules for identifying and tracking entities within the physical environment based on the graph, wherein the rules include:
      a rule for determining that an entity has moved from one location in the physical environment to another location within the physical environment based at least in part on the edges of the graph; and
      a rule for determining that the entity has moved from the one location in the physical environment to the another location within the physical environment based at least in part on the entity moving more recently within the physical environment than another entity that is a candidate for a detected move to the another location;
   receiving first data from a first sensor in the physical environment, the first sensor corresponding to a first vertex in the graph, the first sensor including a first type of sensor;
   determining a current location of a first entity based at least in part on the first data;
   receiving second data from a second sensor in the physical environment, the second sensor corresponding to a second vertex in the graph;
   determining a current location of a second entity based at least in part on the second data;
   receiving third data from a third sensor in the physical environment, the third sensor corresponding to a third vertex in the graph, the third sensor including a second, different type of sensor, wherein the third vertex is connected to the first vertex by a first edge of the graph and the third vertex is connected to the second vertex by a second edge of the graph; and
   executing instructions on a computer processor to update the current location of the first entity within the physical environment based at least in part on the first vertex being connected to the third vertex by the first edge of the graph and the first entity moving more recently in the physical environment than the second entity.

2. A method as recited in claim 1, further comprising:
   analyzing the first data from the first sensor and the third data from the third sensor using behaviometrics; and
   identifying, based at least in part on the analyzing, the first entity as a specific entity.

3. A method as recited in claim 1, further comprising:
   analyzing the first data from the first sensor and the third data from the third sensor using a Viterbi algorithm; and
   identifying, based at least in part on the analyzing, the first entity as a specific entity.

4. A method as recited in claim 1, wherein a supervised learning technique is used to learn a mapping from sensor event contexts to the first entity based on training data.

5. A method as recited in claim 4, wherein the supervised learning technique comprises a naïve Bayes classifier.

6. A method as recited in claim 4, wherein the supervised learning technique comprises a hidden Markov model.

7. A method as recited in claim 1, wherein the rules further include a rule for identifying a new entity, wherein the rule for identifying the new entity is based at least in part on receiving data from a sensor at a location with no known adjacent entities.

8. A method as recited in claim 1, wherein the rules further include a rule for determining that an entity has exited the physical environment, wherein the rule for determining that the entity has exited the physical environment is based, at least in part, on the entity:
   moving to a location adjacent to a doorway, or
   failing to generate a sensor event for a predetermined period of time.

9. A method as recited in claim 1, wherein the first type of sensor includes a motion sensor and the second type of sensor includes a light sensor.

10. A method as recited in claim 1, wherein the first type of sensor includes a light sensor and the second type of sensor includes a motion sensor.

11. A method comprising:
   defining a transition matrix for a physical environment, wherein:
      the physical environment includes a plurality of sensors; and
      the transition matrix represents, for each particular sensor of the plurality of sensors, a plurality of probabilities, each probability being a probability of an entity moving from a location associated with another sensor of the plurality of sensors to a location associated with the particular sensor;
   determining a location of a first entity;
   determining a location of a second entity;
   receiving a sensor event from a first sensor in the physical environment;
   based at least in part on receiving the sensor event:
      determining, based on the transition matrix, a first probability that the first entity moved from the determined location of the first entity to a location associated with the first sensor; and
      determining, based at least in part on the transition matrix, a second probability that the second entity moved from the determined location of the second entity to the location associated with the first sensor; and identifying the first entity within the physical environment as an entity that caused the sensor event based at least in part on the first probability being greater than the second probability.

12. A method as recited in claim 11, wherein the first probability that the first entity moved from the determined location of the first entity to the location associated with the first sensor is based at least in part on training data that indicates a relative frequency with which an entity moves between the determined location of the first entity and the location associated with the first sensor.

13. A method as recited in claim 11, further comprising updating the transition matrix based at least in part on data observed within the physical environment.

* * * * *